(12) United States Patent
Buchanan et al.

(10) Patent No.: US 6,309,509 B1
(45) Date of Patent: Oct. 30, 2001

(54) COMPOSITION AND PAPER COMPRISING CELLULOSE ESTER, ALKYLPOLYGLYCOSIDES, AND CELLULOSE

(75) Inventors: Charles Michael Buchanan; Eric Eugene Ellery, both of Kingsport; Matthew Davie Wood, Gray, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 08/730,650

(22) Filed: Oct. 11, 1996

(51) Int. Cl.[7] .................................................. D21F 11/00
(52) U.S. Cl. ............................ 162/141; 162/5; 162/10; 162/12; 162/72; 162/76; 162/112; 162/135; 162/146; 162/157.1; 162/157.6; 162/157.7; 162/158; 162/163; 162/164.7; 162/182; 131/332; 131/341; 536/18.6; 264/210.1; 264/514
(58) Field of Search ................................ 162/141, 5, 10, 162/12, 72, 76, 112, 135, 146, 157.1, 157.6, 157.7, 158, 163, 164.7, 182; 131/332, 341; 536/18.6; 264/210.1, 514

(56) References Cited

U.S. PATENT DOCUMENTS

| | | |
|---|---|---|
| 1,683,347 | 9/1928 | Gray et al. . |
| 1,698,049 | 1/1929 | Clarke et al. . |
| 1,880,560 | 10/1932 | Webber et al. . |
| 1,880,808 | 10/1932 | Clarke et al. . |
| 1,984,147 | 12/1934 | Malm . |
| 2,129,052 | 9/1938 | Frodyce . |
| 2,666,713 | 1/1954 | Lang et al. . |
| 2,887,429 | 5/1959 | Griggs et al. . |
| 2,976,205 | 3/1961 | Snead et al. . |
| 3,008,472 * | 11/1961 | Touey ................................ 131/208 |
| 3,008,474 | 11/1961 | Touey et al. . |
| 3,053,677 | 9/1962 | Touey . |
| 3,103,462 | 9/1963 | Griggs et al. . |
| 3,261,899 | 7/1966 | Coates . |
| 3,617,201 | 11/1971 | Berni et al. . |
| 4,171,987 * | 10/1979 | Horiguchi et al. ................ 106/122 |
| 4,427,614 | 1/1984 | Barham et al. . |
| 4,721,780 | 1/1988 | McDaniel, Jr. et al. . |
| 4,795,675 * | 1/1989 | Dunn, Jr. et al. ................. 428/260 |
| 4,880,592 | 11/1989 | Martini et al. . |
| 4,940,513 | 7/1990 | Spendel . |
| 4,959,125 | 9/1990 | Spendel . |
| 4,996,306 | 2/1991 | McDaniel, Jr. et al. . |
| 5,104,981 | 4/1992 | Yamamuro et al. . |
| 5,138,046 | 8/1992 | Wuest et al . |
| 5,234,720 | 8/1993 | Neal et al. . |
| 5,240,562 * | 8/1993 | Phan et al. ........................ 162/158 |
| 5,246,545 | 9/1993 | Ampulski et al. . |
| 5,382,377 * | 1/1995 | Raehse et al. .................... 252/174 |
| 5,385,642 | 1/1995 | Phan et al. . |
| 5,631,078 * | 5/1997 | Ellery et al. .................. 428/311.71 |
| 5,662,773 * | 9/1997 | Frederick et al. ...................... 162/4 |

FOREIGN PATENT DOCUMENTS

| | | |
|---|---|---|
| 0132043 | 1/1985 | (EP) . |
| 347176 | 12/1989 | (EP) . |
| A2 347177 | 12/1989 | (EP) . |
| 0387912 | 9/1990 | (EP) . |
| 94/26974 | 11/1994 | (WO) . |

OTHER PUBLICATIONS

Richard J. Lewis, Hawley's Condensed Chemical Dictionary, 12th ed. (New York: Van Nostrand Reinhold, 1993), 396.*

* cited by examiner

Primary Examiner—Stanley S. Silverman
Assistant Examiner—M. Halpern
(74) Attorney, Agent, or Firm—Cheryl J. Tubach; Bernard J. Graves, Jr.

(57) ABSTRACT

This invention relates to compositions, paper, thermoplastic sheets, and medical paper containing cellulose ester, alkylpolyglycoside (APG) or a mixture of APG and polyether glycol, and, optionally, cellulose. The process of incorporating APG or a mixture of APG and polyether glycol in paper composed of cellulose ester fibers and cellulose fibers and to calendaring of such paper is also disclosed.

11 Claims, 4 Drawing Sheets

COMPOSITION AND PAPER COMPRISING CELLULOSE ESTER, ALKYLPOLYGLYCOSIDES, AND CELLULOSE

TECHNICAL FIELD

This invention relates generally to a composition comprising cellulose ester and alkylpolyglycosides (APG) or a mixture of APG and polyether glycol, and, optionally, cellulose.

This invention also relates to paper comprising cellulose fibers, cellulose ester fibers, and APG or a mixture of APG and polyether glycol. The process of incorporating APG or the mixture of APG and polyether glycol into the paper comprising cellulose ester fibers and cellulose fibers and to calendaring of such paper is also set forth.

This invention also relates to cellulose ester containing synthetic paper coated or plasticized with APG or a mixture of APG and polyether glycol as a thermoplastic sheet and as medical paper.

BACKGROUND OF THE INVENTION

Paper has been used in applications such as bags, wrapping paper, printing paper, photographic paper, and the like.

In general, specific applications require specific modifications in the paper making process to prepare a paper for that specific application.

For example, different additives are typically added to the fibers to improve the dry and wet strength of paper. Other substances are sometimes applied to the surface of the paper to impart water or grease proofing, or to render the paper bondable to other substrates such as a polyethylene plastic sheet.

In this context, it has been desirable to have paper whose composition would allow the sheets of the paper to have both good wet and dry strength.

It has also been desirable to have the same paper sheet exhibit barrier properties or be bondable to another substrate without coating the sheet with another substance such as an adhesive. Attempts have been made in the past to construct such a paper sheet.

Charles Snead and Ralph Peters in U.S. Pat. No. 2,976,205 describe the preparation of webs and sheets from cellulose esters. In this patent, the inventors disclose the use of 100% cellulose esters, primarily cellulose acetate, to form sheets. The sheets optionally could be treated with a plasticizer. Upon treatment with heat and pressure, the sheet became a transparent, homogenous sheet.

Similarly, Griggs et al., in U.S. Pat. No. 3,103,462, disclose a method for improving the strength characteristics of paper by including greater than 75% of a partially acetylated cellulose fiber and sizing the paper with classical sizing agents. Plasticizers were not considered, however.

The methods disclosed in U.S. Pat. Nos. 2,976,205 and 3,103,462 revolve around the "wet" process of classical paper making.

In U.S. Pat. No. 3,261,899, Coates describes a "dry" process for making synthetic fiber paper which involves web carding cellulose acetate stable fiber that has a length greater than 0.5 inch. Optionally, the paper can contain natural fiber such as wood pulp. In the method of U.S. Pat. No. 3,261,899, the web is sprayed with a plasticizer and calendared in the temperature range of 65° C. to 190° C.

All of the methods described in U.S. Pat. Nos. 2,976,205, 3,103,462, and 3,261,899 have similar problems. All of these inventions disclose very high levels of cellulose acetate which raises the costs of these synthetic papers relative to papers utilized in the market place.

The high level of cellulose acetate makes these "synthetic" papers more of a moldable plastic sheet rather than a classical paper sheet. That is, these sheets are not really suitable for conventional paper applications.

The inventors of these previous inventions desired to take advantage of the high cellulose acetate content of these papers and, recognizing the need for plasticization of cellulose acetate, attempted to add plasticizer to the synthetic papers. Unfortunately, the classical cellulose acetate plasticizers described in U.S. Pat. Nos. 2,976,205 and 3,261,899 are not convenient for use in classical paper making operations.

As will become apparent, one of the critical components of the present invention are alkylpolyglycosides (APG).

Alkylpolyglycosides are nonionic surfactants which have found widespread acceptance in a number of applications such as detergents, cosmetics, deinking agents, and the like.

Examples of the preparation of APG are disclosed in U.S. Pat. No. 5,138,046 (1992) to Wuest, Eskuchen, Wollmann, Hill, and Biermann; U.S. Pat. No. 4,996,306 (1991) to McDaniel and Johnson; U.S. Pat. No. 4,721,780 (1988) to McDaniel and Johnson; U.S. Pat. No. 5,104,981 (1992) to Yamamuro, Amau, Fujita, Aimono, Kimura; EP publication 0132043 (1984) to Davis and Letton; and EP publication 0387912 (1990) to Yamamuro, Koike, Sawada, and Kimura.

With regard to the use of APG as paper additives, Spendel, in EP Application A2 347176 (1989) and in U.S. Pat. No. 4,959,125 (1990), discloses tissue paper (paper towels and toilet tissues) consisting of wood pulp sprayed with a non-ionic surfactant (APG is preferred) and starch aqueous solutions. This combination gives improved softness and strength. The process for preparing such tissue paper is disclosed by Spendel in U.S. Pat. No. 4,940,513 (1990) and in EP Application A2 347177 (1989). Later, Phan et al., in U.S. Pat. No. 5,385,642 (1995) and in WO 94/26974 (1994), disclosed a process for treating tissue paper with a tri-component biodegradable softener composition, one component of which is an APG.

Similarly, Ampuluski and Trokhan, in U.S. Pat. No. 5,246,545 (1993), disclose a process for applying chemical additives (e.g., APG) to a hot roll by spraying, evaporation of solvent from the roll, leaving a concentrated layer of the additives, and transfer of the layer to the dry web of tissue paper.

None of the above-mentioned references are related to or require the use of a cellulose ester.

With regard to the use of APG as paper coatings, Lang and Baird in U.S. Pat. No. 2,666,713 (1954) claim the product of the reaction between a carbohydrate, including alkyl glycosides, and an aldehyde, as an additive for paper, which will increase the absorbance of water by the paper.

Touey, in U.S. Pat. No. 3,053,677 (1962), discloses that carbohydrate esters (eg. methylglycoside tetraacetate) can be blended with petroleum waxes and applied to paper as coatings.

The use of APG in conjunction with a cellulose ester is known. For example, Touey, in U.S. Pat. No. 3,008,472 (1961), discloses using methyl glycosides as a hydroscopic agent and carrier for additives such as starch or calcium carbonate. The additives/agents are applied to cellulose acetate filter tow and upon exposure to high humidity, the additives bond to the tow.

In a related patent, Touey and Mumpower (U.S. Pat. No. 3,008,474 (1961)) describe dissolving carbohydrate esters in plasticizers or in an organic solvent, mixing in powder additives, and spraying the solution onto cellulose acetate filter tow. In all of these applications, the APG serves strictly as a carrier and as an agent to absorb moisture.

While the above-mentioned references relate to combinations of cellulose fiber with cellulose acetate fiber, cellulose acetate fiber with APG, cellulose fiber with APG, or processes to make these combinations, none of these references have recognized the distinct advantages and uniqueness of the product of the present invention that results from paper containing cellulose acetate as a synthetic fiber, and APG as a paper additive, which functions both as a plasticizer and a coating and as a strength additive.

In the medical packaging field, medical paper used in medical packaging serves a very important function. The medical paper acts as a filter to remove particulates and microorganisms, while at the same time allowing gas and water vapor to enter and escape during the sterilization process.

A medical instrument, e.g. a syringe, is placed in a plastic tray (typically polyethylene or modified polyester) and then the paper is sealed over the opening of the tray. The paper is pattern coated with an adhesive in such a manner that spaces on the sheet are not coated. This allows the paper to be adhered to the plastic while allowing gases to enter and leave the medical packaging during sterilization.

Because one side of the paper must be easily printed upon, the adhesive is typically applied to one side of the sheet and this application is made in a post paper making step.

In considering this process, it is evident that there is a need for an additive which can be added directly to paper during the paper making process as an aqueous based system. The combination of this paper and additive should provide a sheet without coating in a second step with an adhesive.

It would also be an advantage if the additive could be applied to one side of the paper. Alternatively, it would be desirable to add the additive directly to the paper making fiber prior to the actual paper making.

Therefore, it is an object of the present invention to provide a composition comprising cellulose, cellulose ester, and APG or a mixture of APG and polyether glycol.

It is a further object of the present invention to provide a paper comprising cellulose fibers, cellulose ester fibers, and APG or a mixture of APG and polyether glycol, in which the paper can optionally contain other paper additives.

The process for incorporating APG or a mixture of APG and polyether glycol in the paper composed of cellulose ester fiber and cellulose fibers, and the process of calendaring such paper to improve the strength of the paper, are also set forth.

It is another object of the present invention to use the synthetic paper according to the present invention as a thermoplastic sheet and as medical paper.

SUMMARY OF THE INVENTION

This invention is directed to a composition, and to papers prepared from such a composition. The process for preparing the compositions and papers of the present invention is also set forth.

One embodiment of the present invention is directed to a composition comprising (a) about 0% to 98% cellulose, (b) about 1% to 99% of an ester of cellulose having from 1 to 10 carbon atoms, and (c) about 1% to 40% of an alkylpolyglycoside, said percentages based on the total weight of components (a), (b) and (c).

A composition according to another embodiment of the present invention comprising (a) about 0% to 98% cellulose, (b) about 1% to 99% of an ester of cellulose having from 1 to 10 carbon atoms, and (c) about 1% to 40% of a mixture of alkylpolyglycoside and polyether glycol, said percentages based on the total weight of components (a), (b) and (c).

Another embodiment of the present invention is directed to paper comprising (a) about 40% to 98% cellulose fibers, (b) about 1% to 60% of fibers of an ester of cellulose having from 1 to 10 carbon atoms, and (c) about 1% to 40% of alkylpolyglycoside, said percentages based on the total weight of components (a), (b) and (c).

Another embodiment of the present invention is paper comprising (a) about 40% to 98% cellulose fibers, (b) about 1% to 60% of fibers of an ester of cellulose having from 1 to 10 carbon atoms, and (c) about 1% to 40% of a mixture of alkylpolyglycoside and polyether glycol, said percentages based on the total weight of components (a), (b) and (c).

The process of applying APG solutions or the mixture of APG and polyether glycol to the cellulose/cellulose ester paper sheets can be done in several ways. The process can include calendaring the APG or the mixture of APG and polyether glycol plasticized/coated cellulose/cellulose ester paper sheet.

The utilization of calendaring, for example, applying some type of thermal treatment to a sheet of paper comprising cellulose, cellulose ester, and APG or a mixture of APG and polyether glycol by passing the sheet of paper through a heated roller, provides a more uniform coating.

calendaring also improves wet and dry paper strength of the paper, so there is an advantage to calendaring.

One process for applying an APG solution or a mixture of APG and polyether glycol comprises incorporating APG in a solution of a cellulose ester having from 1 to 10 carbon atoms and precipitating the cellulose ester into a nonsolvent so that a portion of the APG is mixed with the cellulose ester solid. The resultant solid can then be spun into fibers.

Another process comprises washing a cellulose ester solid having from 1 to 10 carbon atoms with APG or a mixture of APG and polyether glycol so that a portion of the APG or a mixture of APG and polyether glycol is taken up by the cellulose ester solid.

A third process comprises passing a cellulose ester fiber having from 1 to 10 carbon atoms through a solution of APG or a mixture of APG and polyether glycol so that APG or a mixture of APG and polyether glycol is absorbed onto the cellulose ester fiber.

A fourth process comprises passing a cellulose ester fiber having from 1 to 10 carbon atoms through a caustic solution to surface hydrolyze the cellulose ester fiber, and passing the surface hydrolyzed cellulose ester fiber through a solution of APG or a mixture of APG and polyether glycol so that APG or a mixture of APG and polyether glycol is absorbed onto the cellulose ester fiber.

Another embodiment of the present invention is directed to a heat sealable paper comprising (a) about 40% to 98% cellulose fibers, (b) about 1% to 60% of an ester of cellulose having from 1 to 10 carbon atoms, and (c) about 1% to 40% of an alkylpolyglycoside, said percentages based on the total weight of components (a), (b) and (c).

A heat sealable paper according to another embodiment of the present invention comprises (a) about 40% to 98% cellulose fibers, (b) about 1% to 60% of an ester of cellulose having from 1 to 10 carbon atoms, and (c) about 1% to 40% of a mixture of alkylpolyglycoside and polyether glycol, said percentages based on the total weight of components (a), (b) and (c).

DETAILED DESCRIPTION OF THE INVENTION

Figure 1A:
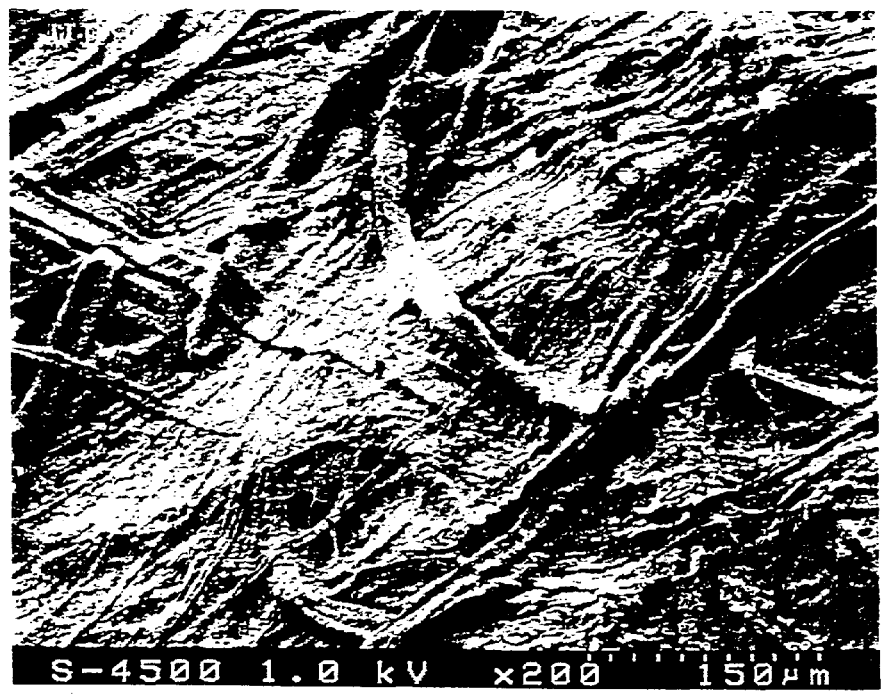
FIG. 1 shows a scanning electron micrograph of the surface of paper containing 35% cellulose acetate; (a) uncoated and (b) coated with 26.5% GLUCOPON 625.

According to the present invention, a composition comprising (a) about 0% to 98% cellulose, (b) about 1% to 99% of an ester of cellulose having from 1 to 10 carbon atoms, and (c) about 1% to 40% of an alkylpolyglycoside (APG) or (d) about 1% to 40% of a mixture of alkylpolyglycoside and polyether glycol (PEG) is useful in the preparation of papers having particular utility, such as heat sealable medical paper.

The cellulose esters of the present invention generally comprise repeating units of the following structure:

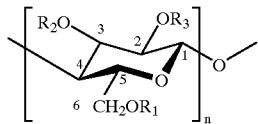

wherein R1, R2, and R3 are selected independently from the group consisting of hydrogen or straight or branched chain alkanoyl having from 1 to 10 carbon atoms. An alkanoyl is an ester group.

The cellulose ester used in formulating the composition can be a cellulose triester or a secondary cellulose ester. Examples of secondary cellulose esters include cellulose acetate, cellulose acetate propionate, and cellulose acetate butyrate. These cellulose esters are described in U.S. Pat. Nos. 1,698,049, 1,683,347, 1,880,808, 1,880,560, 1,984,147, 2,129,052 and 3,617,201, incorporated herein by reference in their entirety.

The cellulose esters useful in the present invention can be prepared using techniques known in the art or are commercially available, e.g., from Eastman Chemical Products, Inc., Kingsport, Tenn., USA.

The cellulose esters useful in the present invention have at least 20 anhydroglucose rings, typically between 50 and 5,000 anhydroglucose rings, and preferably from about 75 to about 500 anhydroglucose rings. Also, such polymers typically have an inherent viscosity (IV) of about 0.2 to about 3.0 deciliters/gram, preferably about 1.0 to about 1.5, as measured at a temperature of 25° C. for a 0.25 gram sample in 50 mL of a 60/40 by weight solution of phenol/tetrachloroethane.

In addition, the degree of substitution per anhydroglucose ring (referred to as DS/AGU) of the cellulose esters ranges from about 1.0 to about 3.0.

Preferred esters of cellulose include cellulose acetate (CA), cellulose propionate (CP), cellulose butyrate (CB), cellulose acetate propionate (CAP), cellulose acetate butyrate (CAB), cellulose propionate butyrate (CPB), and the like. The most preferred ester of cellulose is cellulose acetate having an average DS/AGU of about 1.7 to 2.6.

The APG preferred for this invention has the following general formula:

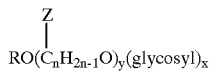

where R is selected from the group consisting of alkyl, alkylphenyl, hydroxyalkyl, hydroxyalkylphenyl, and mixtures thereof, in which the alkyl groups contain from about 4 to about 18, preferably from about 6 to about 14, carbon atoms; n is 2 to 4, preferably 2, y is from about 0 to about 10, preferably 0; x is from about 1 to about 10, preferably from about 1.3 to about 2.5; and wherein Z is H or is an alkyl with 1–20 carbon atoms, preferably 1.

The glycosyl is derived from carbohydrates or polysaccharides. The most preferred carbohydrates or polysaccharides are glucose, starch, or cellulose.

To prepare these compounds, an alcohol is reacted with a carbohydrate or polysaccharide to form the glycoside in which the point of attachment is at position 1.

Additional glycosyl units can then be attached between their 1-position and the preceding glycosyl units 2-, 3-, 4, and/or 6- positions. Optionally, the remaining positions having free hydroxyl groups can be substituted with C1 to C10 esters or with ethers or polyglycol ethers.

The polyether glycols useful for the present invention have the following general formula:

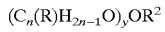

where R is selected from the group consisting of hydrogen, methyl, and ethyl, n is 2 to 4, preferably 2, and y is from about 2 to about 25, preferably about 4 to about 15, and $R^2$ is hydrogen, methyl, ethyl, propyl, butyl, acetyl, propionyl, butryl, or phenyl, preferably hydrogen or methyl. Examples of such polyether glycols are polyethylene glycol 400 or polypropylene glycol 200 where 400 or 200 refer to the average molecular weight.

Figure 4:
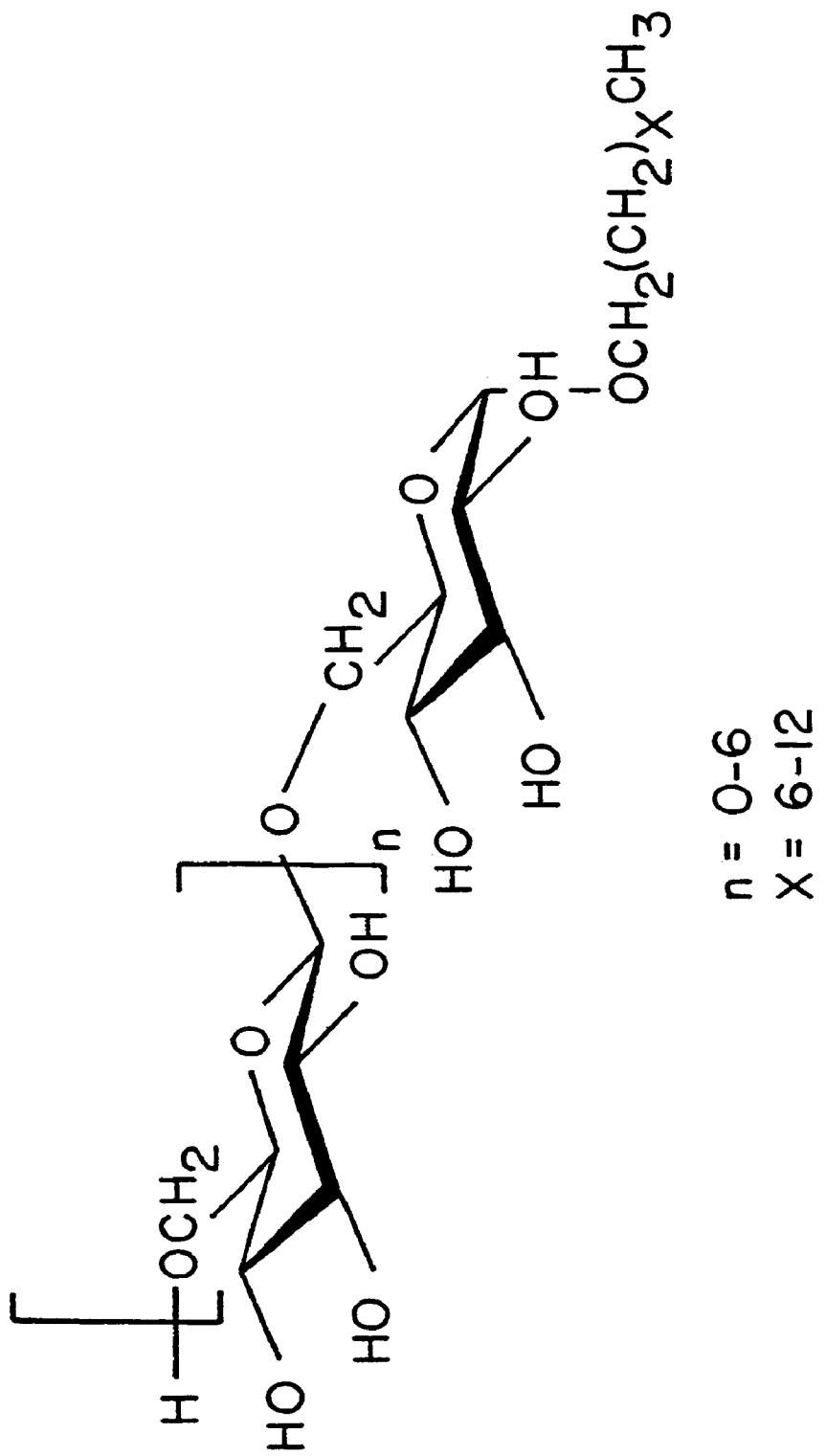
FIG. 4 illustrates the structure for alkylpolyglycoside. The high density of hydroxyls on the carbohydrate portion makes that portion of the molecule hydrophilic, while the long alkyl chain makes the other portion of the molecule hydrophobic.

The APG utilized in the present invention is a non-ionic surfactant, and is characterized by having a long carbohydrate portion (or area) and an alkyl portion (or area). This is illustrated in FIG. 4. The long carbohydrate portion gives the APG its hydrophilicity. The alkyl portion gives the APG its hydrophobicity.

Figure 3:
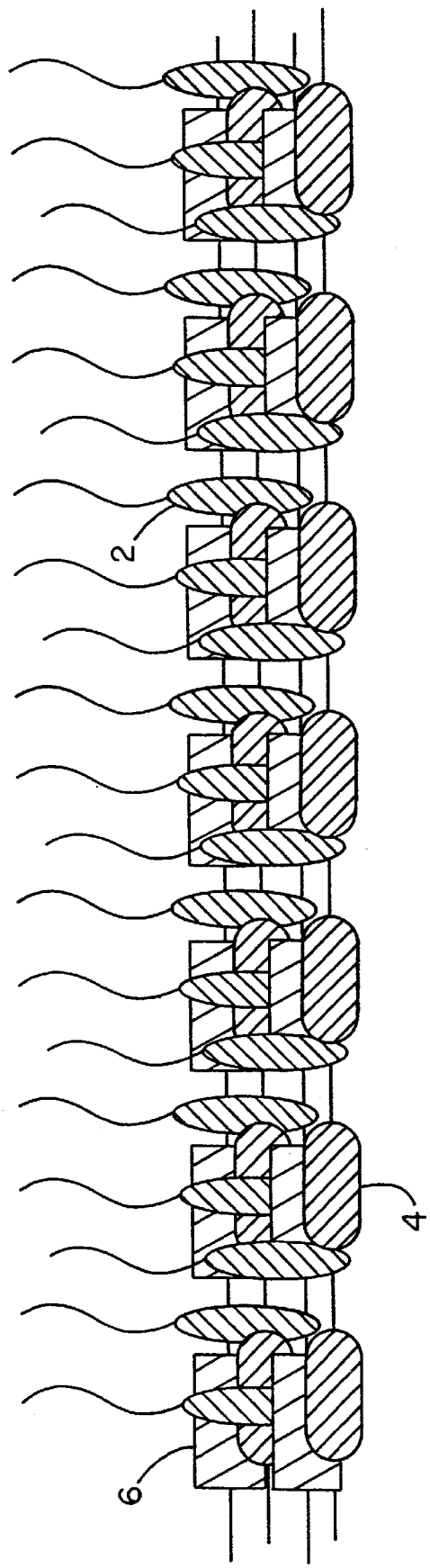
FIG. 3 is a schematic view of one possible arrangement or interaction of APG with cellulose and cellulose ester polymer chains. In this figure, the vertical, oval-shaped elements 2 represent the hydrophilic carbohydrate portion of the APG. These elements are each positioned between the cellulose chains (the horizontal, oblong-shaped elements 4) and the cellulose ester chains (the horizontal, rectangular-shaped elements 6) with the hydrophobic tail of the APG orientated to the surface.

Without wishing to be bound by theory, it is believed that the APG or portions of the APG utilized according to the present invention can position itself between the polymer chains of a polymer, allowing the chains of the polymer to slip back and forth. Therefore, the APG according to the present invention weakens the interaction between the polymer chains of the polymer. In this sense, the APG functions as a classical plasticizer. FIG. 3 illustrates this aspect of the present invention.

In another sense, the APG can act as a coating. When APG or a mixture of APG and polyether glycol is applied to paper in an aqueous solution during the paper making process, it is thought that the APG anchors itself into the paper, and presents its hydrophobic portion as a barrier to liquids at the surface of the paper. That is, the carbohydrate portion prefers to associate with the cellulose acetate fibers and the cellulose fibers in the paper, while the hydrophobic alkyl group prefers orientation away from the hydrophilic polysaccharide, toward the paper surface, thus forming a barrier to water, at the surface of the paper. In this way, the APG functions as a coating.

Since the APG functions as both a plasticizer and coating as discussed above, the terms "plasticizer" and "coating" are used interchangeably in the present invention. This is a unique aspect of the present invention.

The paper making cellulose fibers useful for the present invention are typically those derived from wood pulp or from cotton linters.

Wood pulps considered for this invention include chemical pulps such as those obtained from Kraft, sulfite, and sulfate pulps, as well as mechanical pulps which include, as examples, groundwood, thermomechanical pulp, and chemically modified thermomechanical pulp.

Also applicable to the present invention are fibers derived from recycled paper. Of these fibers, chemically modified softwood is preferred. Mixtures of these cellulose fibers can be utilized.

A broad composition range exists in the present invention when using APG as the plasticizer coating.

In the broadest sense, the composition according to one embodiment of the present invention comprises (a) about 0% to 98% cellulose, (b) about 1% to 99% of an ester of cellulose having from 1 to 10 carbon atoms, and (c) about 1% to 40% of an alkylpolyglycoside, said percentages based on the total weight of components (a), (b), and (c). A more preferred composition comprises (a) about 10% to 85% cellulose, (b) about 5% to 80% of an ester of cellulose having from 1 to 10 carbon atoms, and (c) about 10% to 30% of an alkylpolyglycoside, said percentages based on the total weight of components (a), (b) and (c). The most preferred composition comprises from (a) about 60% to 85% cellulose, (b) about 40% to .5% of an ester of cellulose having from 1 to 10 carbon atoms, and (c) about 10% to 20% of an alkylpolyglycoside, said percentages based on the total weight of components (a), (b) and (c).

A broad composition range is also possible in the present invention when using a mixture of APG and polyether glycol as the plasticizer/coating.

In the broadest sense, the composition of the present invention comprises (a) about 0% to 98% cellulose, (b) about 1% to 99% of an ester of cellulose having from 1 to 10 carbon atoms, and (c) about 1% to 40% of a mixture of an alkylpolyglycoside and polyether glycol, said percentages based on the total weight of components (a), (b) and (c).

A more preferred composition comprises from (a) about 10% to 85% cellulose, (b) about 5% to 80% of an ester of cellulose having from 1 to 10 carbon atoms, and (c) about 10% to 30% of a mixture of an alkylpolyglycoside and polyether glycol, said percentages based on the total weight of components (a), (b) and (c).

The most preferred composition comprises from (a) about 60% to 85% cellulose, (b) about 40% to 5% of an ester of cellulose having from 1 to 10 carbon atoms, and (c) about 10% to 20% of a mixture of an alkylpolyglycoside and polyether glycol, said percentages based on the total weight of components (a), (b) and (c).

With regard to the APG and polyether glycol mixture as the plasticizerxcoating, the APG is present from about 2% to about 98% based upon the total weight of the APG and polyether glycol mixture, and the polyether glycol is present from about 2% to about 98% based upon the total weight of the APG and polyether glycol mixture. A more preferred mixture composition is from about 30% to about 70% APG based upon the total weight of the APG and polyether glycol mixture, and from about 30% to about 70% polyether glycol based upon the total weight of the APG and polyether glycol mixture. The most preferred mixture composition is from about 40% to about 60% APG based upon the total weight of the APG and polyether glycol mixture and from about 40% to about 60% polyether glycol based upon the total weight of the APG and polyether glycol mixture.

Physical mixing of the components can be accomplished in a number of ways such as mixing in the appropriate solvent (e.g., acetone), followed by film casting and evaporation of the solvent. Such solvent mixed materials can be thermally processed in a second step as part of the mixing process.

Physical mixing of the components can also be accomplished by thermally compounding. The most preferred method is by thermally compounding in an apparatus such as a torque rheometer, a single screw extruder, or a twin screw extruder.

The mixtures can be converted to films by a number of methods known to those skilled in the art. For example, films can be formed by compression molding as described in U.S. Pat. No. 4,427,614, by melt extrusion as described in U.S. Pat. No. 4,880,592, by melt blowing, or by other similar methods. The mixtures can also be used for injection molding or for extrusion to form shaped articles.

In the cases where the compositions are obtained by solvent casting or by thermally compounding, it is preferred that the APG or the mixture of APG and polyether glycol contain substantially no water.

However, in those cases where the APG or the mixture of APG and polyether glycol are part of a paper sheet where a solvent is utilized in delivering the APG or the mixture of APG and polyether glycol to the sheet, water is the preferred solvent.

The concentration of APG or the mixture of APG and polyether glycol in the aqueous solutions is from about 1% to 75% in the aqueous solution based upon the amount of APG or based upon the amount of the mixture of APG and polyether glycol present. A more preferred range is from about 3% to about 50%, and the most preferred range is from about 1 to about 30% in the aqueous solution.

The paper making cellulose ester fibers useful for the present invention can be obtained by a number of different processes.

Fibers can be made by spinning reaction solutions of the cellulose ester or by spinning a solution of the cellulose ester from a volatile solvent. Examples of, but not limited to, reaction solutions include those obtained at the end of acid catalyzed aqueous hydrolysis of a cellulose acetate. Examples of, but not limited to, volatile spinning solvents are acetone, acetone/water, methylene chloride, or methylene chloride/MeOH.

Alternatively, reclaimed cellulose acetate fiber from filter tow manufacture or from cigarette manufacture can be utilized before or after surface hydrolysis. Such fiber is disclosed in U.S. Pat. Nos. 5,234,720, 5,505,898 and 5,662,773 incorporated herein in their entirety.

In those cases where fibers are spun from reaction solutions of the cellulose ester or from a volatile solvent, an APG or an APG and polyether glycol mixture can be included in the spinning solvent so that the plasticizer is incorporated directly into the fiber.

The concentration of APG or the APG and polyether glycol mixture in the spinning solvent can range from about 1% to about 50% in the spinning solvent. A more preferred range is from about 3% to about 30% in the spinning solvent. The most preferred range is from about 10% to about 20% in the spinning solvent.

In the case where fibers are spun from reaction solutions utilizing an APG and polyether glycol mixture, the APG is present from about 2% to about 98% based upon the total weight of the APG and polyether glycol mixture, and the polyether glycol is present from about 2% to about 98% based upon the total weight of the APG and polyether glycol mixture. A more preferred mixture composition is from about 30% to about 70% APG based upon the total weight of the APG and polyether glycol mixture and from about 30% to about 70% polyether glycol based upon the total weight of the APG and polyether glycol mixture. The most preferred mixture composition is from about 40% to about 60% APG based upon the total weight of the APG and polyether glycol mixture and from about 40% to about 60% polyether glycol based upon the total weight of the APG and polyether glycol mixture.

For both the APG or the APG and polyether glycol mixture, the preferred solvent is water.

The cellulose ester fibers used in making paper can be passed through a deacylating solution of chemicals such as NaOH, KOH, $Ca(OH)_2$ in such a manner that hydrolysis or additional hydrolysis of the cellulose ester occurs on the surface of the cellulose ester fiber.

The cellulose ester fibers used in making paper can also be passed through a bath containing a solution of APG in such a manner that APG is absorbed onto the surface or into the interior of the cellulose ester fiber. Alternatively, the cellulose ester fiber can be passed sequentially through a deacylating solution and APG solution.

Also, due to the stability of APG to basic solutions, the cellulose ester fiber can be passed through a single bath containing both the deacylating solution and the APG solution.

The concentration of chemicals such as NaOH in the deacylating bath can range from about 0.5% to 50% in the bath based upon the weight percent of NaOH in solution. The preferred range is from 1–10% in the bath, and a more preferred range is from 2–5% in the bath. The concentration of APG in the APG solution is about from 1% to 75% in solution. A more preferred range is from about 3% to about 50% in solution. The most preferred range is from about 5% to about 20% in solution. The preferred solvent for the APG is water.

The coating/plasticizer of this invention, namely APG or the mixture of APG and polyether glycol, can be applied to either wet or dry paper during the paper making stage. The most preferred way is applying the coating/plasticizer of the present invention to dry paper.

The APG or the mixture of APG and polyether glycol can be applied directly as a liquid, sprayed onto the paper, or applied in a concentrated form from a transfer roll. After applying to the paper, the paper is dried prior to use.

The concentration of the APG or of the APG and polyether glycol mixture in the liquid or spray can range from about 1% to about 50% in the liquid based upon the amount of APG or upon the amount of the mixture of APG and polyether glycol present. A more preferred range is from about 3% to about 30% in the liquid. The most preferred range is from about 10% to about 20% in the liquid.

In the case of the APG and polyether glycol mixture, the APG is present from about 2% to about 98% based upon the total weight of the APG and polyether glycol mixture, and the polyether glycol is present from about 2% to about 98% based upon the total weight of the APG and polyether glycol mixture. A more preferred mixture comprises from about 30% to about 70% APG based upon the total weight of the APG and polyether glycol mixture and from about 40% to about 60% APG based upon the total weight of the APG and polyether glycol mixture, and from about 40% to about 60% polyether glycol based upon the total weight of the APG and polyether glycol mixture. For both the APG or the APG and polyether glycol mixture, the preferred solvent is water.

As is evident from the aforementioned disclosure, paper compositions with APG or with the APG and polyether glycol mixture can be prepared in a number of ways.

The inventors of the present invention have discovered that the initial distribution of the APG or of the APG and polyether glycol mixture is dependent upon how the APG or the APG and polyether glycol mixture is applied.

Surprisingly, the inventors of the present invention have discovered that when the APG or the APG and polyether glycol mixture is applied to one side of the paper, the APG essentially remains on that side of the sheet. Accordingly, the APG or the APG and polyether glycol mixture for the most part remains, or predominantly remains, or mostly remains on that side of the sheet. Subsequent calendaring, however, changes the distribution of the APG in the paper sheet.

According to this aspect of the present invention, the APG is acting as a coating which can advantageously be applied to one side of the paper. The resultant product from this aspect of the present invention is very different from the materials obtained when the APG is included directly into the fiber prior to the paper making process or into a resin prior to making a shaped object discussed earlier. In these cases, the APG acts as a plasticizer.

As discussed earlier, the plasticizer utilized in the present invention is referred to as a coating as well as a plasticizer because it does plasticize the cellulose ester, but when applied on one side of the paper, it stays on one side of the paper, and provides barrier properties. Without wishing to be bound or limited by theory, it is believed that the carbohydrate portion (or area) of the APG associates with the cellulose ester fibers and cellulose fibers, while the hydrophobic alkyl portion (or area) prefers to orientate to the surface of the paper thereby forming a barrier to liquids, including water. However, the APG does interact with the cellulose ester fibers and the cellulose fibers, thus reducing polymer chain interactions. The word "associates" utilized herein refers to interaction between APG and the cellulose ester and cellulose by one or more mechanisms, e.g., by hydrogen bonding or dipole-dipole interaction. The APG or APG/PEG mixture (the APG and polyether glycol mixture) as utilized in the present invention is therefore characterized as a plasticizer with coating like characteristics.

Because of this unique aspect of the present invention, the term plasticizer and coating are used interchangeably (plasticizer/coating) in the present invention.

Accordingly, the novelty in terms of the heat sealable paper of the present invention is that when APG or a mixture of APG and polyether glycol is applied in aqueous solution on one side of the sheet, it stays on that side of the sheet.

Therefore, APG or a mixture of APG and polyether glycol is applied without destroying the porosity of the paper, i.e., air is able to go back and forth through the heat sealable paper, while maintaining the heat sealable properties of the paper. This is unique because, unless very special dot matrix coating techniques are utilized, usually coatings that are applied to a sheet of paper bond the fibers together, and destroy the pores present in the sheet so that air cannot go back and forth through the paper. As a result, although such a paper may have a barrier to water, the paper does not maintain its porosity.

In heat sealable medical paper, it is important that the paper maintain its porosity in order to ensure that the medical ingredient placed in it is properly sterilized, using, for example, ethylene oxide or steam. The paper must allow moisture vapors to go back and forth, since heat and steam are generated during the sterilization process, while keeping the ethylene oxide inside, and at the same time, the paper must be able to repel liquids.

For the heat sealable medical paper according to the present invention, a more preferred composition comprises 20–40% cellulose acetate and 3–10% APG or a 3–10% mixture of APG/PEG, the balance being cellulose fibers and paper additive. A most preferred composition comprises 25–35% cellulose acetate and 4–6% APG or a 4–6% mixture of APG and polyether glycol, the balance being cellulose fibers and paper additive. If too much cellulose acetate is present, the strength of the paper decreases. If too little cellulose acetate is present, porosity is not achieved. Accordingly, these are the most preferred values for maintaining heat sealability, porosity, and strength of the paper.

Paper containing cellulose acetate can be prepared using standard methods well known to those skilled in the art. A number of different chemical additives can be applied to the sheet including, but not limited to, cationic starch, alkyl ketene dimer, alkenyl succinic anhydride, carboxy methyl cellulose, sodium bicarbonate, and polyamine-amide-epichlorohydrin resins.

The following examples are illustrative of the present invention, but should not be interpreted as a limitation thereon.

EXAMPLES

The physical properties of the paper prior to coating depends upon a number of factors such as the amount of cellulose ester in the sheet and the paper additives added to the sheet.

The following is illustrative of paper compositions used in the present invention.

Using standard methods well known to those skilled in the art, paper having a basis weight of 67.7 gm$^{-2}$ was prepared from 35% surface hydrolyzed cellulose acetate stable cut fibers and 65% northern bleached softwood pulp (percentages based on the bone dry fiber furnish weight only) to which was added 0.10% alkyl ketene dimer, 1.0% sodium carboxy methyl cellulose, and 2.0% Kymene (chemical addition percentages based on total bone dry fiber furnish weight).

Alkylpolyglycosides were obtained from the Henkel Corporation under the trade names of GLUCOPON and PLANTAREN. These APG's were supplied as aqueous solutions containing 52–53 wt % APG. The APG's were characterized by proton NMR spectroscopy as having the following structural characteristics:

| APG | # Glucose/alkyl (DP) | Average Chain Length | α/β ratio |
| --- | --- | --- | --- |
| PLANTAREN 1200 | 1.47 | 12.3 | 1.5 |
| PLANTAREN 2000 | 1.48 | 9.9 | 2.0 |
| GLUCOPON 625 | 1.7 | 13 | 1.8 |
| Plantaren 1300 | 1.7 | 12.3 | 1.5 |

The α/β ratio is standard terminology in the field and refers to the configuration at C1 of the carbohydrate.

As noted above, the coating/plasticizer of the present invention can be applied to the paper by a number of different methods. In the following examples, the method that was chosen was to apply the coating/plasticizer to the dry sheet using a TMI coater equipped with a #0 coating rod which can be obtained from Testing Machines Incorporated (Amityville, N.Y.). When using a TMI coater, the sheet of paper is clamped to a pad and the coating rod is placed in two brackets positioned at the head of the sheet of paper. The desired solution, e.g., APG, is spread in front of the coating roll. The coating roll is then moved by an electrical motor across the sheet at a fixed speed and pressure.

Also in the examples that follow, when referring to wt % plasticizer, this indicates the weight percent of APG or the mixture of APG and polyether glycol in the solution.

Also, in the context of the present invention, calendaring means that the paper was subjected to an elevated temperature and pressure for a brief period of time, typically 5–10 seconds.

The break stress and Young's Modulus of the paper sheets were measured by ASTM method D882 and the Elmendorf tear force is measured by ASTM method D1938.

Abbreviations used herein are as follows: "IV" is inherent viscosity; "g" is gram; "wt." is weight; "mil" is 0.001 inch; "mL" is milliliters. Relative to naming of the cellulose ester, "CAP" is cellulose acetate propionate; "CA" is cellulose acetate; "CAB" is cellulose acetate butyrate. "RH" is relative humidity.

Example 1

A 25 wt % solution of 75/25 CA (DS/AGU =2.1 where DS/AGU is the degree of substitution per anhydroglucose ring)/PLANTAREN 2000 was prepared by dissolving the cellulose acetate and APG in a mixture of 54 mL of acetone and 6 mL of water. Films were solvent cast from the solution by pouring the solution onto a metal plate and drawing the solution with a 15 mil blade to form a 15 mil thick film.

After drying in a vacuum oven at 60° C. for approximately 14h, the films were pressed between two metal plates at 195° C. for approximately 10 sec which provided an optically clear, thin and flexible film. This example demonstrates that APG is an effective plasticizer for cellulose acetate.

Example 2

A 25 wt % solution of 75/25 CAB (DS/AGU=2.7) PLANTAREN 2000 was prepared by dissolving the cellulose acetate butyrate and APG in a mixture of 60 mL of acetone and 6 mL of water. Films where solvent cast from the solution by pouring the solution onto a metal plate and drawing the solution with a 15 mil blade.

After drying in a vacuum oven at 60° C. for approximately 14 h, the films were pressed between two metal plates at 195° C. for approximately 10 sec which provided an optically clear, thin and flexible film. This example demonstrates that APG is an effective plasticizer for a cellulose mixed ester such as cellulose acetate butyrate.

Example 3

A 25 wt % solution of 75/25 CA (DS/AGU=2.1)%(40/60 PLANTAREN 2000/PEG400) was prepared by dissolving the cellulose acetate and APG and polyether glycol in a mixture of 54 mL of acetone and 6 mL of water. Films were solvent cast from the solution by pouring the solution onto a metal plate and drawing the solution with a 15 mil blade.

After drying in a vacuum oven at 60° C. for approximately 14 h, the films were pressed between two metal plates at 195° C. for approximately 10 sec which provided an optically clear, thin and flexible film. This example demonstrates that APG and polyether glycol mixtures are effective plasticizers for cellulose acetate.

Example 4

A 26.5 wt % aqueous solution of GLUCOPON 625 CS was coated onto paper containing no cellulose acetate and onto paper containing 35% cellulose acetate, using a TMI coating apparatus. The paper utilized here has a basis weight of 67.7 $gm^{-2}$ and was prepared from 35% surface hydrolyzed cellulose acetate staple cut fibers and 65% northern bleached softwood pulp. The paper was dried and mechanical properties were measured under dry conditions (23° C., 50% RH, MPa) and wet conditions (60° C., 95% RH MPa).

| | | Break Stress | | | |
|---|---|---|---|---|---|
| | | (23° C., 50% RH, MPa) | | (60° C., 95% RH, MPa) | |
| % Cellulose Acetate | Plasticizer | Machine Direction | Transverse Direction | Machine Direction | Transverse Direction |
| 0 | none | 59.8 | 27.8 | 50.4 | 23.2 |
| 0 | 26.5% APG | 48.4 | 23.3 | 45.4 | 22.8 |
| 35 | none | 38.5 | 15.5 | 11.6 | 4.8 |
| 35 | 26.5% APG | 40.0 | 15.6 | 21.9 | 12.0 |

| | | Young's Modulus | | | |
|---|---|---|---|---|---|
| | | (23° C., 50% RH, MPa) | | (60° C., 95% RH, MPa) | |
| % Cellulose Acetate | Plasticizer | Machine Direction | Transverse Direction | Machine Direction | Transverse Direction |
| 0 | none | 4347 | 1406 | 1886 | 899 |
| 0 | 26.5% APG | 3223 | 1128 | 1950 | 638 |
| 35 | none | 2218 | 665 | 272 | 42 |
| 35 | 26.5% APG | 2567 | 985 | 961 | 353 |

This example illustrates that in the absence of cellulose acetate, the strength (break stress) and stiffness (Young's modulus) of the paper decreases upon coating with APG, but if cellulose acetate is incorporated into the paper sheet, the strength and stiffness of the paper increases, particularly under wet conditions, when coated with APG. Accordingly, when no cellulose acetate is present in the paper (top 2 examples of each of the above tables), the Young's modulus and Break Stress decreases when APG is added, but when the cellulose acetate is present (bottom 2 examples of each of the above tables), the Young's modulus and Break Stress actually increases when APG is added. Therefore, Example 4 shows that when a combination of APG and cellulose acetate is incorporated in the paper sheet, unique results with respect to the strength and stiffness of the paper are obtained.

Example 5

A 26.5 wt % aqueous solution of GLUCOPON 625 CS was coated onto paper containing from 0–84% cellulose acetate using a TMI coating apparatus. The paper was dried and mechanical properties were measured under dry conditions (23° C., 50% RH, MPa) and wet conditions (60° C., 95% RH, MPa). Porosity was measured on dried sheets under ambient conditions. This example establishes that a broad range of cellulose acetate can be present in the paper.

| | | Break Stress | | | |
|---|---|---|---|---|---|
| | | (23° C., 50% RH, MPa) | | (60° C., 95% RH, MPa) | |
| % Cellulose Acetate | Plasticizer | Machine Direction | Transverse Direction | Machine Direction | Transverse Direction |
| 0 | 26.5% APG | 48.4 | 23.3 | 45.4 | 22.8 |
| 25 | 26.5% APG | 44.0 | 20.7 | 32.6 | 16.8 |
| 35 | 26.5% APG | 40.0 | 15.6 | 21.9 | 12.0 |
| 84 | 26.5% APG | 2.9 | 2.4 | 2.2 | 1.6 |

| | | Young's Modulus | | | |
|---|---|---|---|---|---|
| | | (23° C., 50% RH, MPa) | | (60° C., 95% RH, MPa) | |
| % Cellulose Acetate | Plasticizer | Machine Direction | Transverse Direction | Machine Direction | Transverse Direction |
| 0 | 26.5% APG | 3223 | 1128 | 1950 | 638 |
| 25 | 26.5% APG | 2486 | 1009 | 1240 | 547 |
| 35 | 26.5% APG | 2567 | 985 | 961 | 353 |
| 84 | 26.5% APG | 213 | 155 | 220 | 203 |

| | | Porosity |
|---|---|---|
| % Cellulose Acetate | Plasticizer | Porosity (sec/100 mL/sq. in) |
| 0 | 26.5% APG | 1165 |
| 25 | 26.5% APG | 572 |
| 35 | 26.5% APG | 192 |
| 84 | 26.5% APG | 22 |

This example additionally illustrates that although there is some decrease in strength and stiffness associated with increasing the amount of cellulose acetate in the paper, substantial amounts of cellulose acetate can be added to the paper while maintaining good physical properties when the paper is coated with APG. This example also shows that increasing cellulose acetate content in the paper significantly decreases the porosity of the paper.

Example 6

A 26.5 wt % aqueous solution of GLUCOPON 625 CS was coated onto paper containing 35% cellulose acetate using a TMI coating apparatus. The paper utilized here is the same paper used in Example 4. The paper was dried and the surface was examined in a Hitachi S4500 field emission gun based scanning electron microscope.

Figure 1B:
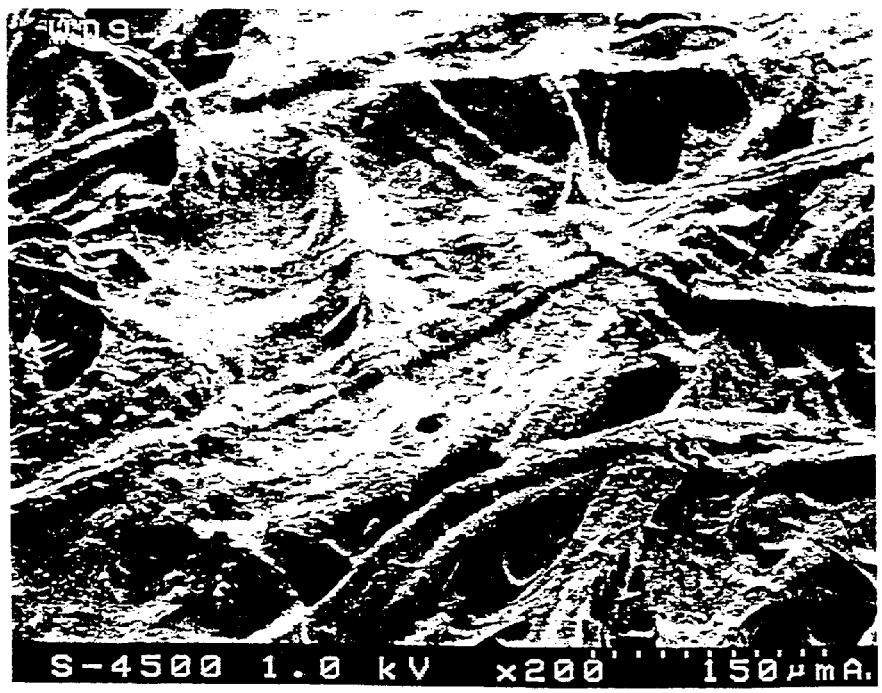
Figure 2A:
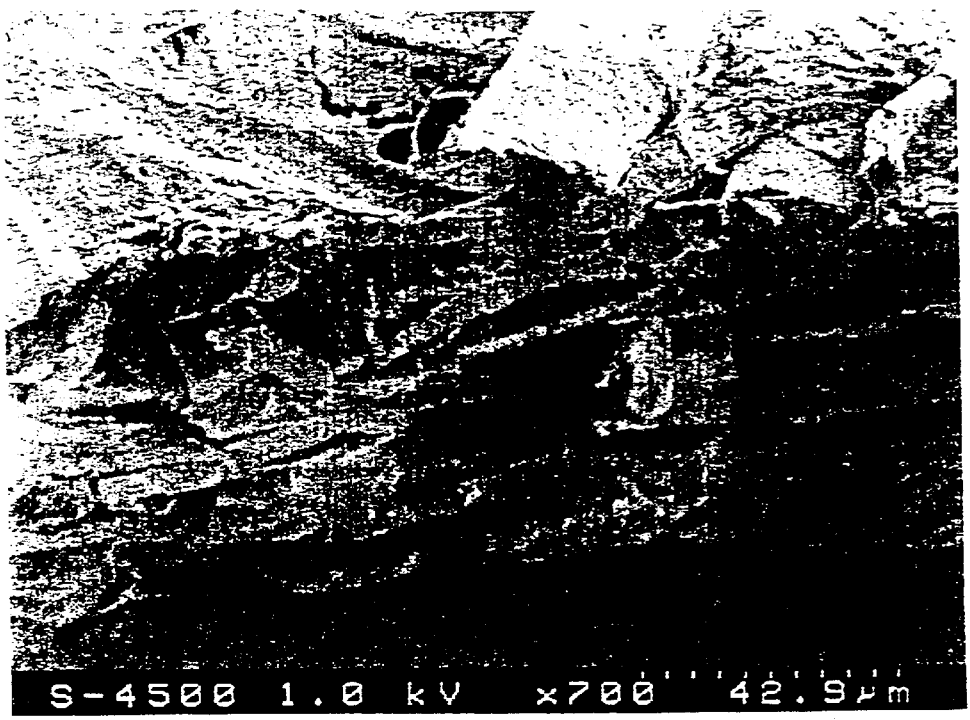
FIG. 2 shows a scanning electron micrograph of a cross-section of paper containing 35% cellulose acetate; (a) uncoated and (b) coated with 26.5% GLUCOPON 625.
Figure 2B:
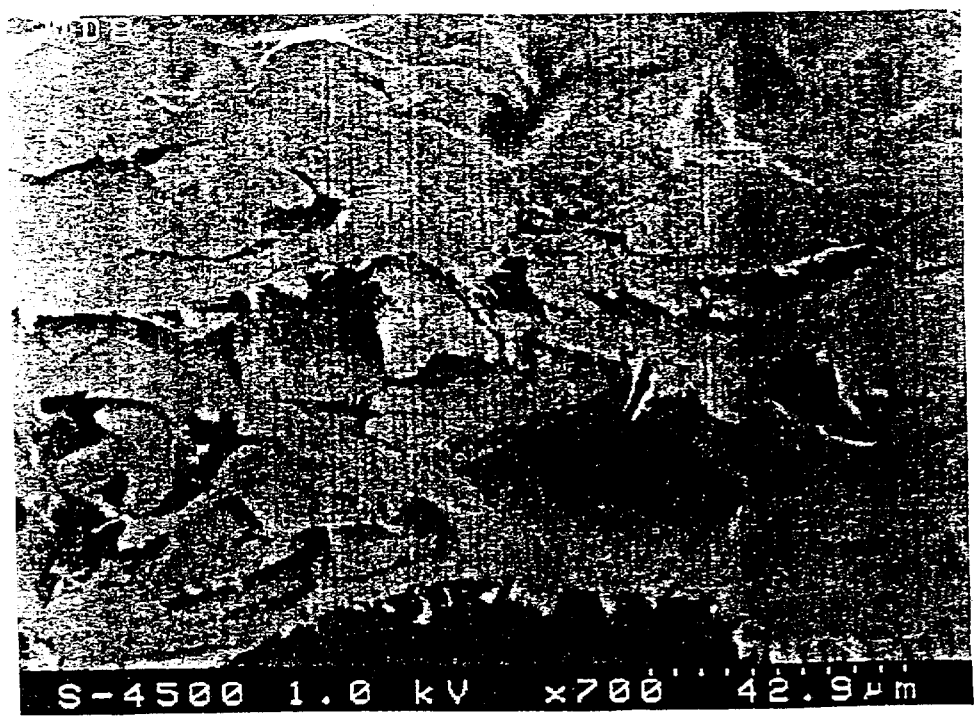

Paper samples were analyzed in the microscope without the need of metal coating and at 1 kV accelerating voltage. FIGS. 1 and 2 show the micrographs of the paper. Uncoated paper side displays numerous fibrils and strands. The APG coated side is easily recognized because the APG obscures and covers the fine fibril structures. Cross sectional views of the coated and uncoated paper surfaces shows the APG to be restricted to the surface to which it was applied.

This example illustrates that the APG can be delivered to only one side of the paper, allowing for one sided coating. The APG does not diffuse to the other side of the paper. The carbohydrate portion of the APG anchors itself to the cellulose fibers and cellulose ester fibers, preventing diffusion of the APG to the other side.

Example 7

Aqueous solutions of APG (26.5 wt % GLUCOPON 625 CS) was coated onto paper containing 35% cellulose acetate using a TMI coating apparatus. The paper utilized here is the same paper used in Example 4. The paper was dried, calendared at different temperatures, and mechanical properties were measured under dry conditions (23° C., 50% RH, MPa) and also under wet conditions (600° C., 95% RH, MPa), shown below. The example demonstrates the effect of calendaring.

| | Break Stress | | | |
| | (23° C., 50% RH, MPa) | | (60° C., 95% RH, MPa) | |
| Calendaring Temperature (°C.) | Machine Direction | Transverse Direction | Machine Direction | Transverse Direction |
| --- | --- | --- | --- | --- |
| none | 33.6 | 15.0 | 30.6 | 12.7 |
| 160 | 42.2 | 20.3 | 31.4 | 14.7 |
| 190 | 54.7 | 25.9 | 15.6 | 12.7 |
| 220 | 63.3 | 25.0 | 19.0 | 14.9 |

| | Young's Modulus | | | |
| | (23° C., 50% RH, MPa) | | (60° C., 95% RH, MPa) | |
| Calendaring Temperature (°C.) | Machine Direction | Transverse Direction | Machine Direction | Transverse Direction |
| --- | --- | --- | --- | --- |
| none | 2453 | 1040 | 1792 | 704 |
| 160 | 3408 | 1400 | 2097 | 811 |
| 190 | 4264 | 1826 | 573 | 173 |
| 220 | 4969 | 1827 | 692 | 446 |

This example also demonstrates that calendaring the plasticized cellulose acetate containing paper sheets serves to substantially increase the strength and stiffness of the dry paper relative to the noncalendered sheet.

Example 8

Aqueous solutions of different APG's, PEG400, and APG/PEG400 mixtures were coated onto paper containing 35% and 37% cellulose acetate using a TMI coating apparatus. The paper was dried and mechanical properties were measured under dry conditions (23° C., 50% RH, MPa) and also under wet conditions (60° C., 95% RH, MPa), shown below.

| | | Break Stress | | | |
| | | (23° C., 50% RH, MPa) | | (60° C., 95% RH, MPa) | |
| % Cellulose Acetate | Plasticizer | Machine Direction | Transverse Direction | Machine Direction | Transverse Direction |
| --- | --- | --- | --- | --- | --- |
| 35 | none | 38.5 | 15.5 | 11.6 | 4.8 |
| 35 | 26.5% GLUCOPON 625 CS | 40.0 | 15.6 | 21.9 | 12.0 |
| 35 | 26.5% PLANTAREN 2000 | 32.8 | 16.3 | 31.4 | 14.9 |
| 35 | 27.2% PLANTAREN 1200 | 40.8 | 15.1 | 31.3 | 12.8 |
| 35 | 26.5% PLANTAREN 1300 | 35.7 | 15.9 | 27.4 | 13.2 |
| 35 | 50% PEG400 | 30.5 | 13.5 | 23.3 | 12.7 |
| 37 | 53% 1/1 PLANTAREN 2000/PEG 400 | 28.7 | 14.0 | | |
| 37 | 26.5% 1/1 PLANTAREN 2000/PEG 400 | 35.3 | 14.1 | | |

| | | Young's Modulus | | | |
| | | (23° C., 50% RH, MPa) | | (60° C., 95% RH, MPa) | |
| % Cellulose Acetate | Plasticizer | Machine Direction | Transverse Direction | Machine Direction | Transverse Direction |
| --- | --- | --- | --- | --- | --- |
| 35 | none | 2218 | 665 | 272 | 42 |
| 35 | 26.5% GLUCOPON 625 CS | 2567 | 985 | 961 | 353 |
| 35 | 26.5% PLANTAREN 2000 | 1997 | 853 | 1256 | 603 |
| 35 | 27.2% PLANTAREN 1200 | 2292 | 687 | 1173 | 428 |
| 35 | 26.5% PLANTAREN 1300 | 2182 | 767 | 1327 | 377 |
| 35 | 50% PEG400 | 1718 | 562 | 710 | 386 |
| 37 | 53% 1/1 PLANTAREN 2000/PEG 400 | 1993 | 805 | | |
| 37 | 26.5% 1/1 PLANTAREN 2000/PEG 400 | 2344 | 649 | | |

Example 8 illustrates that a broad range of APG's and APG/PEG mixtures are useful in the present invention.

Example 9

Aqueous solutions of APG (GLUCOPON 625 CS) at different concentrations were coated onto paper containing 35% cellulose acetate using a TMI coating apparatus. The paper was dried and mechanical properties were measured under dry conditions (23° C., 50% RH, MPa) and also under wet conditions (60° C., 95% RH, MPa), shown below.

| | Break Stress | | | |
|---|---|---|---|---|
| | (23° C., 50% RH, MPa) | | (60° C., 95% RH, MPa) | |
| Plasticizer | Machine Direction | Transverse Direction | Machine Direction | Transverse Direction |
| none | 38.5 | 15.5 | 11.6 | 4.8 |
| 7.6% GLUCOPON 625 CS | 35.7 | 15.2 | 34.2 | 13.9 |
| 17.3% GLUCOPON 625 CS | 40.7 | 17.4 | 28.6 | 14.0 |
| 20.8% GLUCOPON 625 CS | 39.9 | 15.2 | 29.4 | 13.2 |
| 23.1% GLUCOPON 625 CS | 37.3 | 17.6 | 29.2 | 14.8 |
| 26.5% GLUCOPON 625 CS | 40.0 | 15.6 | 21.9 | 12.0 |
| 50% GLUCOPON 625 CS | 35.7 | 15.7 | 26.0 | 11.7 |

| | Young's Modulus | | | |
|---|---|---|---|---|
| | (23° C., 50% RH, MPa) | | (60° C., 95% RH, MPa) | |
| Plasticizer | Machine Direction | Transverse Direction | Machine Direction | Transverse Direction |
| none | 2218 | 665 | 272 | 42 |
| 7.6% GLUCOPON 625 CS | 2422 | 855 | 1712 | 606 |
| 17.3% GLUCOPON 625 CS | 2507 | 934 | 1551 | 596 |
| 20.8% GLUCOPON 625 CS | 2558 | 880 | 1264 | 557 |
| 23.1% GLUCOPON 625 CS | 2259 | 902 | 1470 | 639 |
| 26.5% GLUCOPON 625 CS | 2567 | 985 | 961 | 353 |
| 50% GLUCOPON 625 CS | 2690 | 1067 | 1308 | 510 |

This example demonstrates that improved strength and stiffness of paper can be achieved over a very broad concentration range of APG applied to the paper.

Example 10

Aqueous solutions of different APG's, PEG400, and APG/PEG400 mixtures were coated onto paper using a TMI coating apparatus. The paper was dried and porosity was measured.

| % Cellulose Acetate | Plasticizer | Porosity (sec/100 mL/sq. in) |
|---|---|---|
| 25 | None | 222 |
| 25 | 26.5% GLUCOPON 625CS | 572 |
| 35 | None | 80 |
| 35 | 26.5% PLANTAREN 1300 | 136 |
| 35 | 17.6% PLANTAREN 1300 | 119 |
| 35 | 13.3% PLANTAREN 1300 | 94 |
| 35 | 7.6% PLANTAREN 1300 | 89 |
| 35 | 50% PEG400 | 79 |
| 37 | None | 44 |
| 37 | 26.5% PLANTAREN 2000 | 108 |
| 37 | 26.5% PLANTAREN 1300 | 90 |
| 37 | 53% 1/1 PLANTAREN 2000/PEG400 | 173 |

This example illustrates that a broad range of porosity is available dependent upon the porosity of the initial sheet (which is related to the amount of CA in the sheet), the type of plasticizer/coating, and concentration of plasticizer/coating applied to the sheet. Such porosity is particularly advantageous when the sheet is used as medical paper where high porosity is required during sterilization of the medical instrument.

Example 11

Aqueous solutions of different APG's and PEG400 were coated onto paper containing different levels of cellulose acetate using a TMI coating apparatus. The paper was dried, sealed to PETG (a polyester used commonly in packaging) at 350° F., and the strength of the seal was determined by measuring the average peel strength, shown below.

| % Cellulose Acetate | Plasticizer | Average Peel (g cm$^{-1}$) |
|---|---|---|
| 25 | 26.5% PLANTAREN 2000 | 140 |
| 35 | 26.5% PLANTAREN 2000 | 34 |
| 35 | 50% PEG400 | 65 |

This example illustrates that good adhesion with a plastic sheet can be obtained, the strength of which is dependent upon the initial sheet, the type of plasticizer coating, and concentration of plasticizer coating applied to the sheet. This adhesion, when combined with good porosity, makes this paper particularly useful for medical packaging.

Example 12

A 25 wt % solution of 75/25 cellulose acetate (DS/AGU =2.1)PLANTAREN 2000 was prepared by dissolving the cellulose acetate and APG in a mixture of 54 mL of acetone and 6 mL of water. The solution was poured into water under high shear to provide a white fine powder. The powder was washed with 3 portions of cold water before drying in a vacuum oven at 60° C. for approximately 14 h. Proton NMR showed that the concentration of APG in the powder was 6.2%. This example illustrates a process for adding APG to CA during the isolation step of the cellulose ester during the manufacturing process. This isolation step for cellulose ester is disclosed in U.S. Pat. Nos. 1,698,049, 1,683,347, 1,880, 808, 1,880,560, 1,988,147, 2,129,052, and 3,617,201 discussed earlier. This example is preparing the APG as an additive adding during the isolation step.

Example 13

A 25 wt % solution of 75/25 cellulose acetate (DS/AGU= 2.1) was prepared by dissolving the cellulose acetate in a mixture of 54 mL of acetone and 6 mL of water. The solution was poured into an aqueous solution 25 wt % PLANTAREN 2000 under high shear to provide a white fine powder. The powder was washed with 3 portions of cold water before drying in a vacuum oven at 60° C. for approximately 14h. Proton NMR showed that the concentration of APG in the powder was 2.9%. This example illustrates a process for adding APG to CA during the isolation step of the cellulose ester during the manufacturing process aforementioned.

Example 14

A mixture of 30 g of cellulose acetate (DS/AGU=2.1) and 10 g of an aqueous solution of 25 wt % PLANTAREN 2000 was tumbled for approximately 14 h before drying in a vacuum oven at 60° C. for approximately 14 h. Proton NMR showed that the concentration of APG in the powder was 8.3%. This example illustrates a process for adding APG to CA during the isolation step of the cellulose ester during the manufacturing process discussed previously.

Example 15

A mixture of 40 g of cellulose acetate (DS/AGU=2.1), 75 mL water, and 25 mL of an aqueous solution of 25 wt % PLANTAREN 2000 was tumbled for approximately 14 h. The excess liquids were removed by filtration and the solids were dried in a vacuum oven at 60° C. for approximately 14 h. Proton NMR showed that the concentration of APG in the powder was 2.3%. This example illustrates a process for adding APG to CA during the isolation step of the cellulose ester during the manufacturing process discussed previously.

Various modes of carrying out the present invention will be evident to those skilled in the art without departing from the spirit and scope of the invention as defined in the claims. Therefore, it is understood that variations and modifications can be effected within the spirit and scope of the present invention.

What is claimed is:

1. Paper made by wet lay forming comprising:
   (a) about 10 to 85% cellulose fibers;
   (b) about 5 to 80% cellulose ester fibers having from 1 to 10 carbon atoms, and:
   (c) about 10 to 30% non-ionic surfactant characterized by having a hydrophilic portion capable of interaction with cellulose ester and/or cellulose and a hydrophobic portion capable of acting as a barrier to water, wherein the non-ionic surfactant is an alklypolyglycoside having the formula:

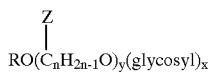

wherein R comprises an alkyl group; an alklphenyl group; a hydroxyalkyl group; a hydroxyalkylphenyl group; or a combination thereof, wherein the alkyl group contains from 4 to 18 carbon atoms;
   n is from 2 to 4;
   x is from 1 to 10;
   y is from 0 to 10;
   Z is hydrogen or an alkyl group having from 1 to 20 carbon atoms; and
   the glycosyl is derived from a carbohydrate or polysaccharide.

2. The paper according to claim 1, comprising: (a) about 60% to 85% cellulose fibers, (b) about 40% to 5% cellulose ester fibers, and (c) about 10% to 20% alkylpolyglycoside.

3. The paper of claims 2, wherein component (c) further comprises polyether glycol.

4. The paper according to claim 3, wherein component (c) comprises from about 2% to about 98% alkylpolyglycoside and from about 2% to about 98% polyether glycol based upon the total weight of the alkylpolyglycoside and the polyether glycol.

5. The paper according to claim 4, wherein component (c) comprises from about 30% to about 70% alkylpolyglycoside and from about 30% to about 70% polyether glycol.

6. The paper of claim 1, wherein the alkyl group of R is from 6 to 14 carbon atoms; n is 2; y is 0; x is from 1.3 to 2.5; Z is hydrogen or an alkyl group having one carbon atom; and the glycosyl is derived from glucose, starch, or cellulose.

7. The paper of claim 3, wherein the polyether glycol comprises polyethylene glycol or polypropylene glycol.

8. The paper of claim 1, wherein the cellulose ester has an inherent viscosity of from 1.0 to 1.5 deciliters/gram in 50 mL of 60/40 by weight solution of phenol/tetrachloroethane.

9. The paper of claim 1, wherein the cellulose ester comprises cellulose propionate, cellulose butyrate, cellulose acetate propionate, cellulose acetate butyrate, or cellulose propionate butyrate.

10. The paper of claim 1, wherein the cell.

11. A paper comprising (a) a cellulosic fiber and a cellulose ester having a first side and a second side and (b) a non-ionic surfactant, wherein the non-ionic surfactant is coated and remains on the first side of the paper and not on the second side of the paper, wherein the non-ionic surfactant comprises an alkylpolyglycoside or a mixture of an alkypolyglycoside and a polyether glycol, wherein the alkylpolyglycoside has the formula:

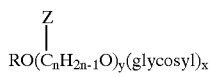

wherein R comprises an alkyl group; an alkylphenyl group; a hydroxyalkyl group; a hydroxyalkylphenyl group; or a combination thereof, wherein the alkyl group contains from 4 to 18 carbon atoms;

n is from 2to4;
x is from 1 to 10;
y is from 0 to 10;
Z is hydrogen or an alkyl group having from 1 to 20 carbon atoms; and
the glycosyl is derived from a carbohydrate or polysaccharide.

* * * * *

UNITED STATES PATENT AND TRADEMARK OFFICE
CERTIFICATE OF CORRECTION

PATENT NO. : 6,309,509 B1  Page 1 of 1
DATED : October 30, 2001
INVENTOR(S) : Buchanan et al.

It is certified that error appears in the above-identified patent and that said Letters Patent is hereby corrected as shown below:

Column 20,
Line 30, change "The paper of claim 1, wherein the cell." to read -- The paper of claim 1, wherein the cellulose ester comprises cellulose acetate. --

Signed and Sealed this

Twenty-fifth Day of June, 2002

Attest:

Attesting Officer

JAMES E. ROGAN
Director of the United States Patent and Trademark Office